(12) United States Patent
Gandon et al.

(10) Patent No.: US 7,628,946 B2
(45) Date of Patent: Dec. 8, 2009

(54) METHOD FOR MANUFACTURING RECEPTACLES BY THERMOFORMING AND PLACEMENT OF DECORATIVE STRIPS ON SAID RECEPTACLES

(75) Inventors: Bernard Gandon, Saint Arnould (FR); Alain Dunan, Etiolles (FR); Dominique Schwab, Versailles (FR)

(73) Assignee: Erca Formseal, Les Ulis (FR)

( * ) Notice: Subject to any disclaimer, the term of this patent is extended or adjusted under 35 U.S.C. 154(b) by 111 days.

(21) Appl. No.: 11/718,909

(22) PCT Filed: Nov. 8, 2005

(86) PCT No.: PCT/FR2005/050934

§ 371 (c)(1),
(2), (4) Date: Jun. 1, 2007

(87) PCT Pub. No.: WO2006/051237

PCT Pub. Date: May 18, 2006

(65) Prior Publication Data

US 2008/0036121 A1   Feb. 14, 2008

(30) Foreign Application Priority Data

Nov. 10, 2004  (FR) .................................. 04 11970
Jul. 6, 2005   (FR) .................................. 05 07189

(51) Int. Cl.
*B29C 39/12* (2006.01)
*B28B 3/00* (2006.01)

(52) U.S. Cl. .................... 264/247; 264/267; 425/126.1; 425/398; 425/521

(58) Field of Classification Search .............. 425/325.1, 425/126.1, 398, 521; 264/247, 267
See application file for complete search history.

(56) References Cited

U.S. PATENT DOCUMENTS 4,462,952 A * 7/1984 Hautemont ................. 264/509
6,428,639 B1 * 8/2002 Oldenburg et al. ............ 156/64

FOREIGN PATENT DOCUMENTS

| DE | 202004017669 U1 | 2/2005 |
| DE | 10348182 A1 | 5/2005 |
| EP | 0296302 | 12/1988 |
| FR | 2308484 | 11/1976 |

* cited by examiner

*Primary Examiner*—Jeremiah Smith
(74) *Attorney, Agent, or Firm*—Sutherland Asbill & Brennan LLP

(57) ABSTRACT

The invention relates to a method of manufacture of receptacles by thermoforming and the placing of decorative banderols on these receptacles, in which a first mould block is provided, which may include at least one thermoforming chamber and which is capable of tilting between a working position for the thermoforming of the receptacles and a tilted position for the introduction of a banderol into the thermoforming chamber before the thermoforming of a receptacle in the chamber.

The invention is characterized in that a second mould block is provided analogous to the first mould block and in that while one of the mould blocks is in the working position for the thermoforming of a receptacle in the thermoforming chamber of this mould block the other mould block is in the tilted position for the introduction of a decorative banderol into its thermoforming chamber before the thermoforming of another receptacle in the chamber.

19 Claims, 6 Drawing Sheets

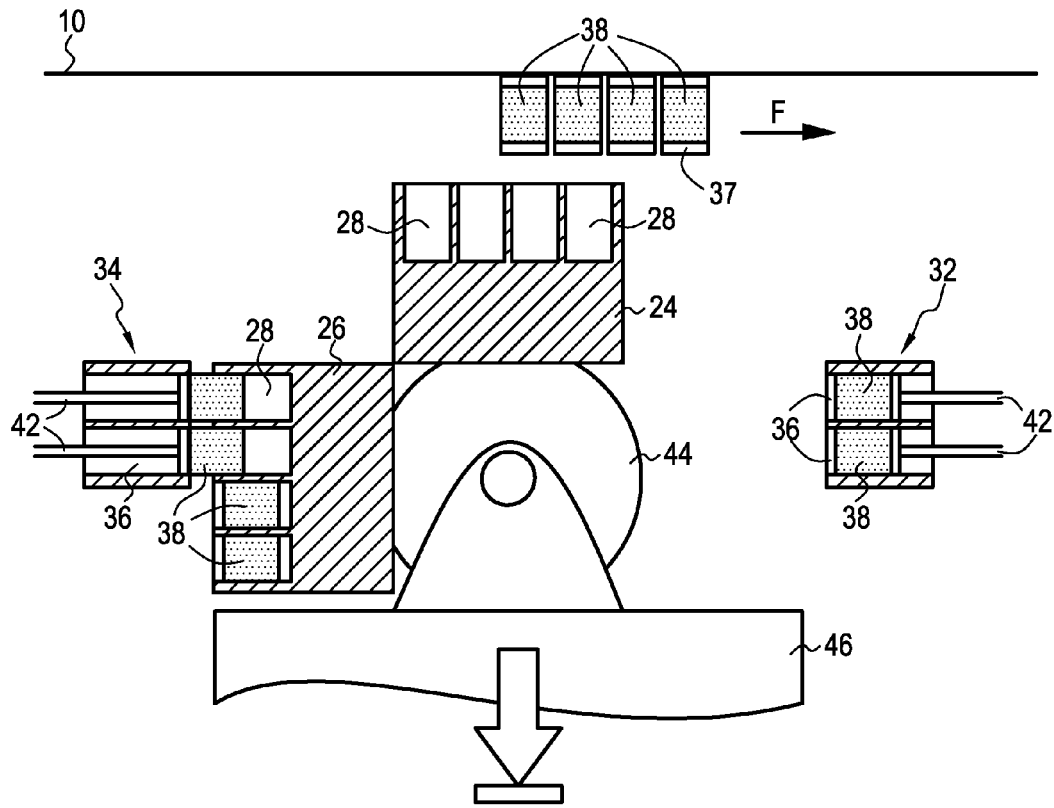
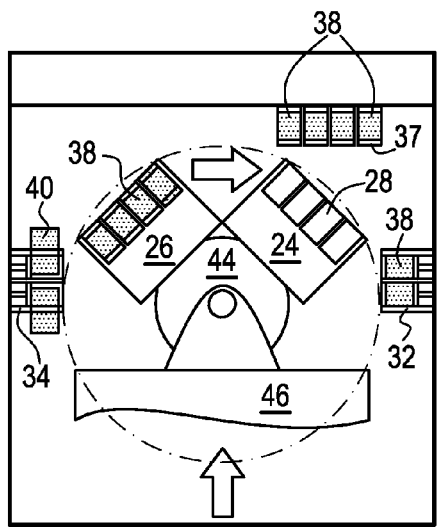 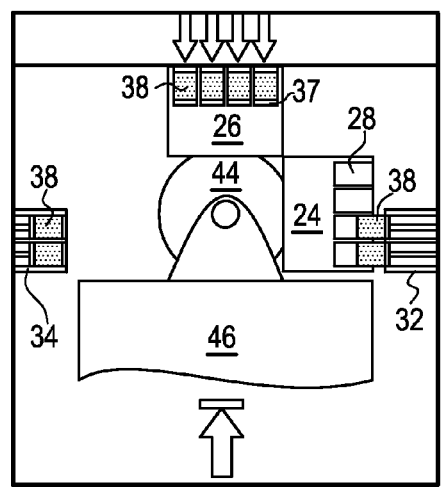
FIG.2
FIG.3  FIG.4

METHOD FOR MANUFACTURING RECEPTACLES BY THERMOFORMING AND PLACEMENT OF DECORATIVE STRIPS ON SAID RECEPTACLES

TECHNICAL FIELD

The present invention relates to a method of manufacture of receptacles by thermoforming and the placing of decorative banderols on these receptacles.

BACKGROUND OF THE INVENTION

According to this method, a first mould block is provided, which comprises at least one thermoforming chamber and which is capable of tilting between a working position for the thermoforming of receptacles and a tilted position for the introduction of a banderol into the thermoforming chamber before the thermoforming of a receptacle in the said chamber.

In a known method of this type, provision is made for a thermoforming station and for a mould block consisting of two mould half-blocks, which, for the placing of decorative banderols in their thermoforming chambers, are capable of tilting in a simultaneous manner, to the right and left respectively, between a working position for the thermoforming of receptacles and a tilted position.

In this specific case, the two half blocks of the mould are conducted simultaneously into the tilted position, a decorative banderol is introduced into each of their thermoforming chambers and the two half-blocks of the mould are then restored to a working position with a view to the thermoforming of the receptacles in the said thermoforming chambers.

After the thermoforming phase, the receptacles are removed just after being thermoformed before the two half-blocks of the mould are again moved into the tilted position in order to introduce a new decorative banderol into each of their thermoforming chambers, in order then to restore all the mould half-blocks into their working position, with a view to the following thermoforming procedure.

It is understood that during this last step the thermoforming station does not function because it is awaiting the movement of the mould block containing new banderols into a working position.

In other words, a substantial period of time elapses between two successive thermoforming phases, corresponding to the time necessary to remove a receptacle which has just been thermoformed, in order to move the two half-blocks of the mould into a tilted position, in order to introduce the decorative banderols into the thermoforming chambers of these half-blocks and to restore them into the working position with a view to subsequent thermoforming.

This period corresponds to downtime for the functioning of the thermoforming station, but also for the whole of the production chain arranged downstream of the thermoforming station.

It is understood that the consequence of this downtime is damaging to the overall productivity yield of the installations which implement the manufacturing process.

The invention proposes to eliminate these disadvantages.

SUMMARY OF THE INVENTION

This aim is achieved thanks to the fact that at least one second mould block is provided analogous to the first mould block and that while one of the said mould blocks is in the working position for the thermoforming of a receptacle in the thermoforming chamber of this mould block the other one or, as applicable, one of the other mould blocks is in the tilted position for the introduction of a banderol into its thermoforming chamber before the thermoforming of another receptacle in the said chamber.

The term "mould block analogous to the first" is understood to mean a mould block likewise comprising at least one thermoforming chamber and which is capable of tilting between a working position for the thermoforming of receptacles and a tilted position for the introduction of a banderol into its thermoforming chamber.

It is understood that with the method according to the invention advantage is taken of the duration of the thermoforming phase of a receptacle in a thermoforming chamber of one of the mould blocks to introduce at least one banderol into a thermoforming chamber of the other mould block before thermoforming another receptacle in this chamber.

It is therefore understood that, according to the present method, the downtime between the two successive phases of the thermoforming is reduced in relation to that which pertains in the known process, since, from the ending of the thermoforming of a receptacle in a thermoforming chamber of one of the mould blocks, the mould block previously provided with banderols is moved into a working position with a view to the thermoforming of another receptacle.

In other words, in relation to the known process, thanks to the method of the present invention, it is possible to thermoform more receptacles in the same period of time. In consequence, productivity output of the installation can be significantly improved by implementing the method forming the object of the invention.

Preferably, if more than two mould blocks are present, a banderol is introduced into the thermoforming chamber of a mould block in the tilted position, choosing as this mould block the one which should come into the working position in the following step.

Preferably, simultaneously one of the mould blocks is conveyed into the working position and the other or one of the other mould blocks is conveyed into the tilted position, which again limits the loss of time.

In a known manner, a thermoforming chamber is aligned in an essentially horizontal position when its mould block is in the tilted position and in an essentially vertical position when its mould block is in the working position.

Advantageously, a decorative banderol is introduced into a thermoforming chamber of one of the mould blocks in the tilted position during the thermoforming of a receptacle in a thermoforming chamber of the other or one of the other mould blocks in the working position.

In general, thermoforming takes longer than the period of time necessary to introduce a decorative banderol into a thermoforming chamber. Advantage can therefore be taken of the time taken for the thermoforming to introduce a decorative banderol into a thermoforming chamber.

Advantageously, after the thermoforming of a receptacle in a thermoforming chamber of one of the mould blocks in the working position, the said receptacle is removed and a decorative banderol is introduced into a thermoforming chamber of the other or one of the other mould blocks in the tilted position during the removal of the said thermoformed receptacle.

Since the period of time necessary for the removal of the receptacle is longer than that necessary for the introduction of a decorative banderol into a thermoforming chamber, advantage can be taken of the removal time to introduce a decorative banderol into a thermoforming chamber.

In general, the removal includes a mould displacement phase for the removal from the mould and a displacement phase for the receptacle(s) removed from the mould. It is rather during this second phase that the introduction of banderol(s) takes place.

Advantageously, in its working position each mould block is capable of occupying a thermoforming position in which a receptacle is thermoformed in a thermoforming chamber of this mould block and a removal position in which a receptacle which has just been thermoformed is removed and a first banderol is introduced into a first thermoforming chamber of a mould block in the tilted position when the other or one of the other mould blocks is in the thermoforming position and another decorative banderol is introduced into another chamber of the mould block in the tilted position when the other or one of the other mould blocks is in the removal position.

Advantageously, when one of the mould blocks is moved into the working position between its thermoforming position and its removal position, the other mould block is moved simultaneously between a tilted position at a first level and a tilted position at a second level.

Advantageously, at least one series of decorative banderols is introduced into one of the mould blocks in the tilted position at the first level, while the other or one of the other mould blocks is in the thermoforming position, and at least one series of decorative banderols is introduced into the mould block in the tilted position at the second level, while the other or one of the other mould blocks is in the removal position.

The term "series of decorative banderols" is understood to mean "at least one decorative banderol", but, since in general each of the mould blocks comprises several thermoforming chambers, "a series of decorative banderols" most often corresponds to several decorative banderols used simultaneously during a thermoforming cycle.

In addition to this, the decorative banderols preferably have the shape of a cylinder open at its ends.

Preferably, a start is made by introducing the banderols into the thermoforming chambers of a mould block in the tilted position, then, when it is in the tilted position at the first level, this mould block is moved into the tilted position at the second level, other banderols are then introduced into other thermoforming chambers of the mould block.

It is understood that in the particular case in which it is wished to thermoform four rows of receptacles simultaneously, i.e. in the situation in which each mould block comprises four rows of thermoforming chambers, it may be difficult to convey four decorative strips as far as the four levels of rows of chambers of a mould block in the tilted position, due to the cumbersome size of the means of conveying the decorative banderols.

It is for this reason that, in the prior art, an arrangement was made of two half-blocks of a mould, each comprising two rows of thermoforming chambers, which are tilted simultaneously to two opposite sides in order to introduce two rows of decorative banderols from each side. Once repositioned, the two half-blocks reconstitute the mould block with four rows.

As can be understood, according to the present method, it is advantageously possible to introduce four rows of decorative banderols from at least one side, because it is sufficient to convey two decorative strips as far as two levels of rows of chambers of a mould block in the tilted position and to move this block in the tilted position between the first and second level by introducing two rows of decorative banderols at each level.

In addition to this, the present method allows in particular for four rows of decorative banderols to be introduced with the aid of two rows of introduction chambers arranged on one side only of the mould block.

In this case, one option is to leave the other side of the mould block accessible for maintenance operations.

Preferably, the introduction of a series of banderols is carried out in a horizontal plane, i.e. laterally in relation to the mould block.

According to a first embodiment, a single second mould block is provided, and one of the mould blocks is tilted in a first direction and the other mould block in the other direction, in such a way that, in the tilted position, the introduction of banderols into one of the mould blocks is effected from a first side, and the introduction of banderols into the other mould block is effected from the side opposed to the first side.

According to a second embodiment, a set of three second mould blocks is provided and the second mould blocks are tilted in the same direction, in such a way that, in the tilted position, the introduction of the decorative banderols is effected from one single side.

The invention likewise concerns a device for the manufacture by thermoforming of receptacles provided with decorative banderols, comprising a first mould block which comprises at least one thermoforming chamber, means for tilting the first mould block between a working position for thermoforming receptacles and a tilted position for the introduction of a banderol into the thermoforming chamber by introduction means before the thermoforming of a receptacle in the said chamber.

An arrangement of this type is already known. It makes use of the known method described heretofore and has the disadvantages which have been indicated above.

The invention proposes to provide a remedy for these disadvantages.

With this aim, the device further comprises at least a second mould block analogous to the first mould block, means to cause the said at least one second mould block to tilt between a working position and a tilted position, means for putting one of the mould blocks into a tilted position for the introduction of a banderol into its thermoforming chamber by introduction means before the thermoforming of a receptacle in the said chamber while the other or, as applicable, one of the other mould blocks is in the working position for the thermoforming of a receptacle in the thermoforming chamber of this mould block.

Advantageously, the means for causing the mould blocks to tilt are capable of causing the mould blocks to pivot together about a pivoting shaft.

According to a first embodiment corresponding to the first mode of implementation of the method according to the invention, the device according to the invention comprises one single second mould block and the first and second mould blocks are arranged orthogonally in relation to one another.

In general, one mould block is pivoted through 90° in order to move it between its tilted position and its working position.

It is then understood that, when the two mould blocks are arranged orthogonally in relation to one another, pivoting through 90° allows for the simultaneous displacement of one of the mould blocks from its tilted position into its working position and the other block from its working position into its tilted position.

According to a second embodiment corresponding to the second mode of implementation of the method according to the invention, the device according to the invention comprises a set of three second mould blocks and the mould blocks are arranged next to one another in such a way that two adjacent mould blocks are orthogonal in relation to one another.

It will therefore be understood that the device comprises four mould blocks, which are referred to as the first, second, third and fourth mould blocks for the sake of convenience.

In this second embodiment, the four mould blocks are preferably mounted on a rotating barrel.

In this situation, the rotating barrel causes all four of the mould blocks to pivot and, preferably, this pivoting always takes place in the same direction.

It is understood that each of the mould blocks also has a second tilted position, opposed to the tilted position for the introduction of a banderol.

Advantageously, the device according to the invention further comprises means for moving one of the mould blocks into the working position between a thermoforming position in which a receptacle is thermoformed in a thermoforming chamber of this mould block and a removal position in which the receptacle which has just been thermoformed is removed and the said means simultaneously allow for the other mould block or blocks to be moved between a tilted position at a first level and a tilted position at a second level.

Preferably, considered in a vertical direction, the first level is arranged above the second level.

Advantageously, the means for moving a mould block into the working position between a thermoforming position and a removal position comprise a plate which is moveable in relation to the introduction means.

In general, the introduction means do not accompany the movement between the first and second levels of a mould block in the tilted position.

Preferably, the plate is capable of moving in a vertical direction.

According to the first embodiment, the mould blocks form part of an assembly of mould blocks and the introduction means are arranged on one side and the other of this assembly.

Preferably, the means for introducing a banderol comprise first means of introduction arranged on one side for introduction into a mould block which, in the tilted position, comes from this side and second means of introduction arranged on another side for introduction into the other mould block which, in the tilted position, comes from this other side.

According to the second embodiment, the mould blocks form part of an assembly of mould blocks and the introduction means comprise one single introduction device arranged on one of the sides of this assembly.

Preferably, the assembly of mould blocks is formed by a rotating barrel on which the four mould blocks are mounted.

The single introduction device is therefore preferably arranged on one of the sides of the barrel.

The result is that, when one of the mould blocks is placed in the second tilted position, it is very easily accessible, for example in order to carry out maintenance operations.

Since each of the mould blocks is capable of being located in the second position, depending on the orientation of the rotating barrel, it is understood that each of the four mould blocks is very easily accessible.

Thanks to this embodiment of the invention, it is understood that it is not necessary for the introduction blocks to be dismantled in order to get access to the mould blocks and to carry out maintenance operations.

These and other features of the present application will become apparent to one of ordinary skill in the art upon review of the following detailed description when taken in conjunction with the drawings and the appended claims.

BRIEF DESCRIPTION Of THE DRAWINGS

The invention will be better understood and its advantages more apparent on reading the description which follows, of an embodiment indicated by way of a non-limitative example. The description relates to the appended drawings, in which:

FIG. 2 is a diagrammatic view of the first embodiment of the device according to the invention, representing the first mould block in the removal position and the second mould block in the tilted position at the second level;

FIG. 3 is a diagrammatic view of the first embodiment of the device according to the invention, showing the simultaneous displacement of the first mould block into the tilted position and the second mould block into the thermoforming position;

FIG. 4 is a diagrammatic view of the first embodiment of the device according to the invention, in which the first mould block is in the tilted position at the first level and the second mould block is in the thermoforming position;

DETAILED DESCRIPTION OF THE INVENTION

Figure 1:
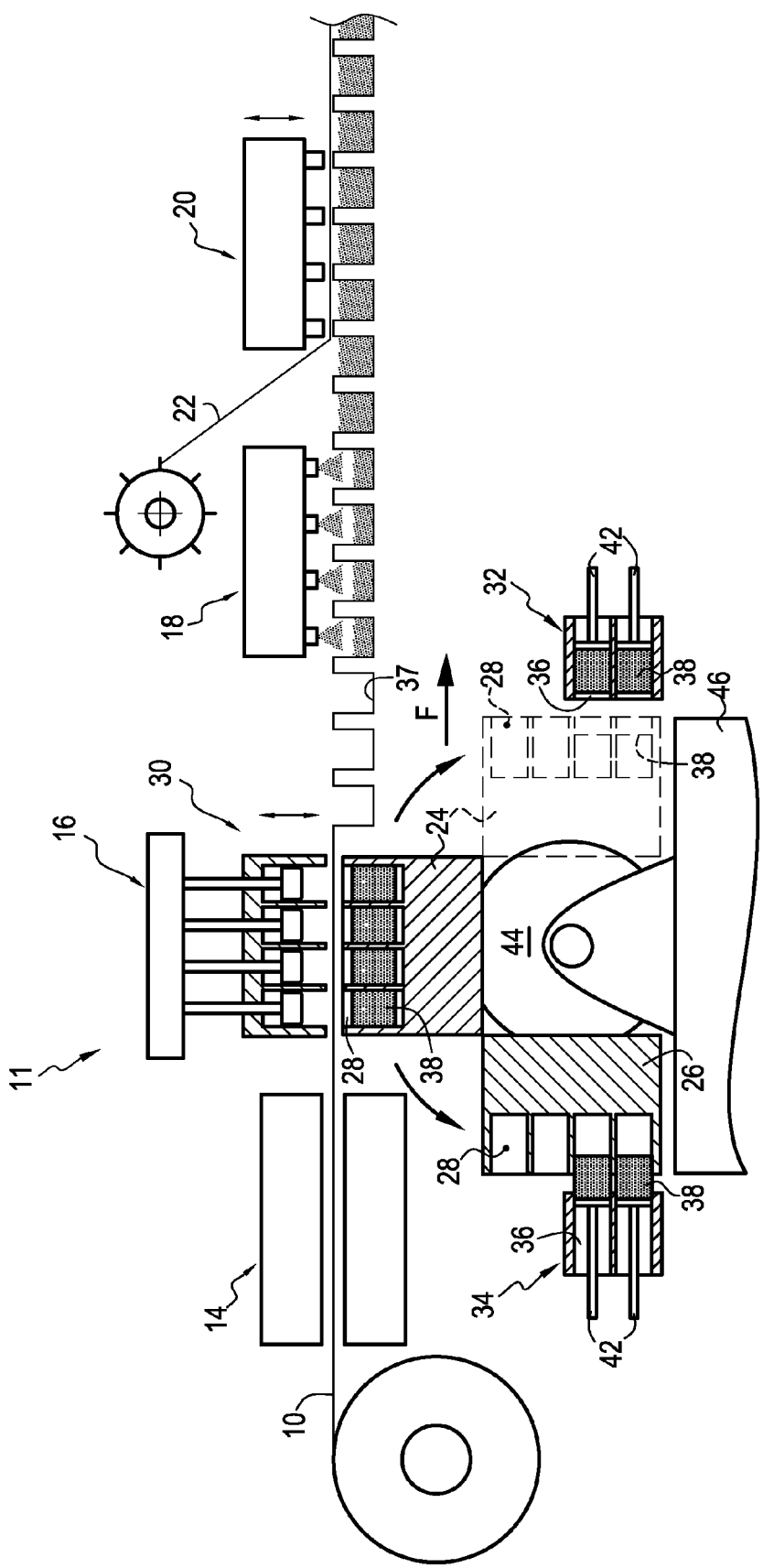
FIG. 1 is a diagrammatic view of an installation implementing a first embodiment of the device according to the invention.

The installation presented in FIG. 1 implements the object of the invention in its first embodiment. It comprises several stations over which is drawn, step by step, a strip 10 made of thermoplastic material, by drawing means (not represented here). Considered in succession in the direction F of advance of the strip, the installation comprises a heating station 14, a thermoforming station 16, a filling station 18 for thermoformed receptacles 37 and a closure station 20 for closing these receptacles 37 by sealing, across their openings, a closure strip 22.

It is clearly understood that the invention applies equally to the thermoforming of receptacles in a thermoplastic material presented in another form than that of a continuous strip, such as in the form of platelets or individual disks from which a receptacle or group of receptacles are thermoformed.

The thermoforming station 16 comprises two mould blocks 24, 26, each of the two mould blocks being provided with a plurality of thermoforming chambers 28.

The thermoforming station 16 likewise comprises a block of thermoforming rams 30, capable of moving in the said thermoforming chambers 28, as well as means for introducing decorative banderols into the thermoforming chambers, comprising two blocks 32, 34 of introduction chambers 36 of decorative banderols 38, oriented preferably in the direction of advance of the strip.

Preferably, the thermoforming rams 30 are only capable of moving in an essentially vertical direction.

In the example represented, the mould block 24 (or the mould block 26 respectively) is connected to the introduction block 32 (or the introduction block 34 respectively). Decorative strips 40 are conducted by conducting means to near the introduction chambers 36. Means not shown here allow for the decorative banderols 38 to be cut off in the strips 40 and to be rolled up in the introduction chambers 36. These means are, for example, analogous to those described in the Patent FR 2 793 185.

These decorative banderols 38 take the form of a cylinder open at both ends.

Means for adjusting the position of a banderol in a thermoforming chamber, as provided in the French Patent Application No. 03 09 217, not published at the priority date of the present application, may be used to equip the present device.

Introduction rods 42 are provided to transfer the decorative banderols 38 rolled up in the introduction chambers 38 to the thermoforming chambers 28, this transfer being effected laterally in relation to the mould blocks 24, 26.

With the aid of FIG. 2, a more detailed description will now be provided of the structure of the device 11 according to the invention in its first embodiment.

The device 11 according to the invention, intended for the manufacture by thermoforming of receptacles 37 provided with decorative banderols 38, comprises a first mould block bearing the reference 24 and a second mould block bearing the reference 26. Each of these two mould blocks 24, 26 comprises a plurality of thermoforming chambers 28.

In this specific case, a mould block 24 comprises four rows of thermoforming chambers 28 (for example, six thermoforming chambers per row), the said ranges extending transversely in relation to the direction of advance F of the thermoplastic strip 10.

Figure 6:
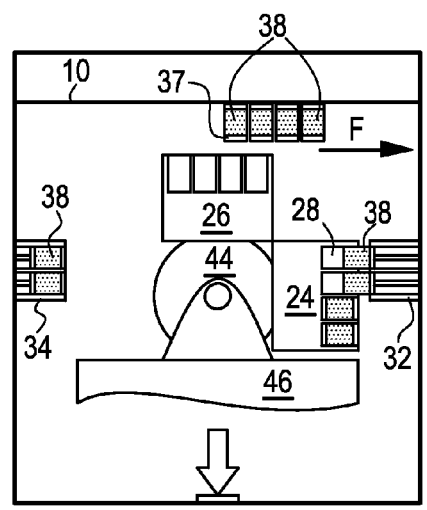
FIG. 6 is a diagrammatic view of the first embodiment of the device according to the invention, in which the first mould block is in the tilted position at the second level and the second mould block is in the removal position.
Figure 8:
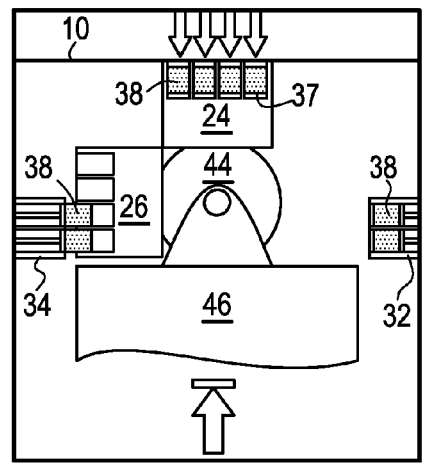
FIG. 8 is a diagrammatic view of the first embodiment of the device according to the invention, in which the first mould block is in the thermoforming position, while the second mould block is in the tilted position at the first level.

By making reference to the FIGS. 4, 6, and 8, it can be seen that a mould block, such as the mould block 26, for example, may be located in four different positions: A thermoforming position (FIG. 4), in which the receptacles 37 are thermoformed by the action of rams, a removal position (FIG. 6), in which the mould block has been displaced downwards in relation to its thermoforming position in order to release the receptacles 37 which have just been thermoformed (mould release), and a tilted position (FIG. 8), in which the mould block has been pivoted by a quarter of a turn in relation to its removal position, in such a way that banderols can be introduced into the thermoforming chambers of this mould block. In addition to this, a mould block in the tilted position can be located at two different levels (FIGS. 4 and 6 for the mould block 26 and FIGS. 8 and 10 for the mould block 24), for the reasons explained hereinafter. For the sake of convenience, it will be said that a mould block is in the working position when it is in the thermoforming or removal position.

The thermoforming chambers of the mould blocks are oriented vertically in the working position, while they are oriented essentially horizontally in the tilted position.

As can be seen in FIG. 2, the two mould blocks are fixed at the periphery by a cylindrical pivoting shaft 44, which is arranged in a horizontal plane and which extends transversely in relation to the direction of advance of the thermoplastic strip 10.

A mould block 24 or 26 is mounted on the pivoting shaft 44 in such a way that its thermoforming chambers 28 extend radially in relation to the cylindrical pivoting shaft 44.

The device according to the invention comprises means to cause the first and second mould blocks to tilt between a working position for the thermoforming of receptacles 37 and a tilted position for the introduction of a banderol into the thermoforming chamber, before the thermoforming of the receptacles 37 in the said chamber. In this specific case, the said means comprise essentially the pivoting shaft 44, of which a rotation of 90° allows for a mould block to be tilted between the working position and the tilted position described heretofore.

In an advantageous manner, the device according to the invention further comprises means to put one of the mould blocks into the tilted position while the other mould block is in the working position. In this specific case, the said means comprise the pivoting shaft 44 and provision is likewise made for the two mould blocks to be arranged orthogonally in relation to one another.

More precisely, the two mould blocks are fixed to the pivoting shaft 44 in such a way that the direction in which the thermoforming chambers of the first mould block extend and the direction in which the thermoforming chambers of the second mould block extend are orthogonal to each other, whatever the angular position of the pivoting shaft 44 may be.

For example, by making reference to FIG. 2, in which the first mould block 24 is located in the working position and the second block is in the tilted position, it will be understood that a rotation of 90° in a clockwise direction of the pivoting shaft 44 will simultaneously displace the first mould block 24 into the tilted position and the second mould block 26 into the working position.

In the same manner, referring, for example, to FIG. 6, in which the first mould block 24 is in the tilted position and the second mould block 26 is in the working position, it will be understood that a rotation of 90° in an anti-clockwise direction of the pivoting shaft 44 will simultaneously displace the first mould block 24 into the working position and the second mould block 26 into the tilted position.

In addition to this, the device 11 according to the invention comprises means 46 to displace a mould block in a working position between the thermoforming position and the removal position described heretofore. In this case, the said means comprise a plate 46 which can be moved in a vertical direction, between a high position in which the said mould block is in a thermoforming position and a low position in which the said mould block is in the removal position.

As can be seen from FIG. 2, the pivoting shaft 44 is mounted in rotation on the plate 46.

With reference to FIGS. 4 and 6 or 8 and 10, it can be seen that a mould block in the tilted position can be located at two different levels, depending on the vertical position of the plate 46.

Figure 10:
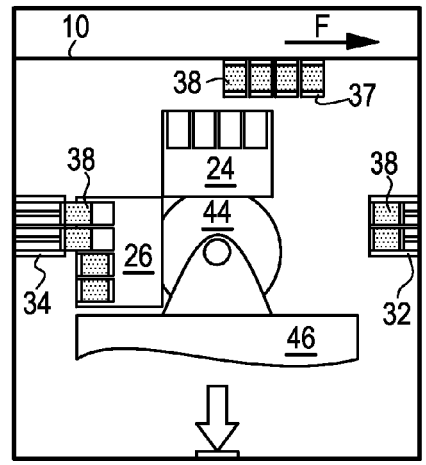
FIG. 10 is a diagrammatic view of the first embodiment of the device according to the invention, in which the first mould block is in the removal position while the second mould block is in the tilted position at the second level.

When the plate 46 is in the high position, as is represented in FIGS. 4 and 8, it can be seen that the mould block in the tilted position is at a first level. In similar fashion, when the plate 46 is in the low position, as is represented in FIGS. 6 and 10, it can be seen that the mould block in the tilted position is at a second level.

The introduction blocks 32, 34 are, in turn, arranged on one side and the other of the plate 46 in such a way that their introduction rods 42 extend in the direction of advance of the thermoplastic strip 10. In consequence, taken in the direction of advance F of the thermoplastic strip 10, the upstream introduction block 34 can be distinguished, located upstream of the plate 46 and the downstream introduction block 32 can be distinguished, located downstream of the plate 46.

Thanks to the Figures, it will be understood that the first mould block 24 (or the second mould block 26 respectively) interacts with the downstream introduction block 32 (or upstream 34 respectively) of the plate 46.

Preferably, each introduction block 32, 34, comprises two transverse rows of introduction chambers 36, each of these rows comprising six introduction chambers 36.

Preferably, the introduction blocks 32, 34, are fixed in relation to a structure, and the thermoforming chambers 28 of a mould block 24, 26 in the tilted position are displaceable in front of the introduction chambers 36, in such a way that when a mould block 24, 26, is in a tilted position at a first level, the introduction chambers 36 of the associated introduction block are located opposite the thermoforming chambers 28 of two adjacent rows of the said mould block 24, 26, and, when a mould block 24, 26, is in a tilted position at a second level, the introduction chambers of the associated introduction block 32, 34 are opposite the thermoforming chambers 28 of the two other adjacent rows of the said mould block 24,26.

With the aid of FIGS. 2 to 10 and the detailed description of the device 11 heretofore, the method according to the invention will now be described in its first mode of implementation.

FIGS. 2 to 10 represent a manufacturing cycle during which thermoforming is carried out, according to the present method, of a series of receptacles 37 in each of the two mould blocks 24, 26.

Starting from the situation represented in FIG. 2, in which the first mould block 24 is in the removal position, the second mould block 26 is in the tilted position at the second level, each of its thermoforming chambers 28 containing decorative banderols 38, the manufacturing cycle will be described as follows.

In this situation, decorative banderols 38 are first introduced into the introduction chambers 36 of the downstream introduction block 32.

The pivoting shaft 44 is caused to pivot through 90° in a clockwise direction, then the plate 46 is displaced into its high position in such a way as, on the one hand, to convey the first mould block 24 into the tilted position at the first level, and, on the other hand, to convey the second mould block 26 into the thermoforming position, as is represented in FIG. 3. During this period, new decorative banderols 38 are rolled into the introduction chambers 36 of the upstream introduction block 34.

In this position, represented in FIG. 4, two rows of decorative banderols 38 are introduced into two associated rows of thermoforming chambers 28 of the first mould block 24, from the introduction chambers of the downstream introduction block 32.

Still in this position, thermoforming of a series of four rows of receptacles 37 is carried out in the thermoforming chambers of the second mould block 26, which is located in the thermoforming position.

After the thermoforming of the series of receptacles 37 in the second mould block 26, the plate 46 is displaced downwards in such a way, on the one hand, as to convey the second mould block 26 into the removal position in order to remove this series of receptacles 37 and, on the other hand, to convey the first mould block 24 into the tilted position at the second level.

Figure 5:
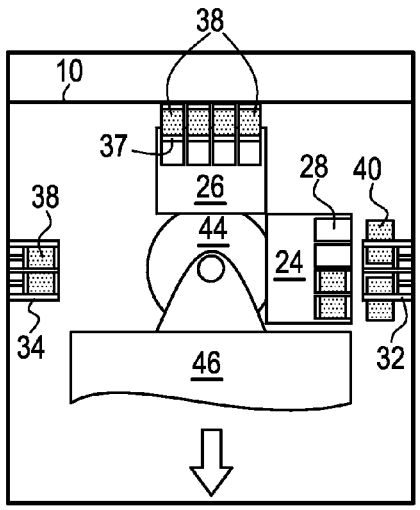
FIG. 5 is a diagrammatic view of the first embodiment of the device according to the invention, showing the simultaneous displacement of the first mould block into the tilted position at the second level and the second mould block into the removal position.

During this period, as can be seen in FIG. 5, new decorative banderols 38 are rolled into the introduction chambers 36 of the downstream introduction block 32.

When the plate is in the low position, as is represented in FIG. 6, the thermoplastic strip 10 advances in such a way as to transfer the receptacles 37 which have just been thermoformed to the filling station. During this period, two other rows of decorative banderols 38 are introduced into the two other rows of thermoforming chambers 28 of the first mould block 24, from the introduction chambers of the downstream introduction block 32.

It will be understood that at this moment each of the thermoforming chambers of the first mould block 24 contains a decorative banderol 38.

Figure 7:
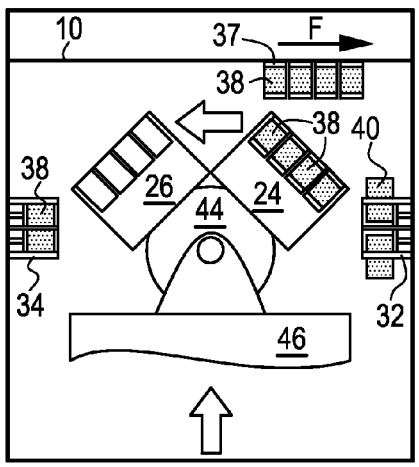
FIG. 7 is a diagrammatic view of the first embodiment of the device according to the invention, showing the simultaneous displacement of the first mould block into the working position and the second mould block into the tilted position.

Next, as can be seen in FIG. 7, the pivoting shaft 44 is rotated through 90° in an anti-clockwise direction, then the plate 46 is displaced into its high position in such a way as to convey the first mould block 24 into the thermoforming position, and the second mould block 26 into the tilted position at the first level.

In this position, as can be seen in FIG. 8, thermoforming of a series of four rows of receptacles 37 is carried out in the first mould block 24, and, during this time, two rows of decorative banderols 38 are introduced into the two rows of thermoforming chambers of the second mould block 26.

Figure 9:
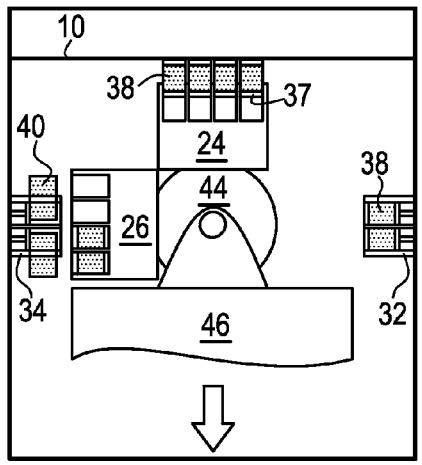
FIG. 9 is a diagrammatic view of the first embodiment of the device according to the invention, showing the simultaneous displacement of the first block into the removal position and the second block into the tilted position at the second level.

Next, as can be seen in FIG. 9, the plate 46 is moved into its low position in such a way as, on the one hand, to convey the first mould block into the removal position in order to remove the series of receptacles 37 which have just been thermoformed, and, on the other hand, to convey the second mould block 26 into the tilted position at the second level. During this time, new banderols 38 are rolled into the introduction chambers 36 of the upstream introduction block 34.

When the plate 46 is in the low position, as is represented in FIG. 10, the thermoplastic strip 10 advances in such a way as to transfer to the filling station 18 the receptacles 37 which have just been thermoformed. During this time, two other rows of decorative banderols 38 are introduced into the two other rows of thermoforming chambers of the second mould block 26, from the upstream introduction block 34.

It will be understood that at this moment each of the thermoforming chambers 28 of the second mould block 26 contains a decorative banderol 38, with a view to subsequent thermoforming.

Accordingly, the complete cycle has now been described according to the method of the invention in its first mode of implementation, in the course of which a series of receptacles 37 is thermoformed in each of the two mould blocks 24, 26.

With the aid of FIGS. 11 to 15, the second mode of implementation of the method according to the invention will now be described together with the second embodiment of the device according to the invention.

The elements which are identical to the first embodiment of the device according to the invention bear the same number reference, increased by 100.

The principal differences between the first and second embodiments and their mode of implementation will be described hereinafter.

The device 111 according to the second embodiment of the invention comprises an assembly of mould blocks 149, comprising a first mould block 150, a second mould block 152, a third mould block 154 and a fourth mould block 156.

Each of these four mould blocks has a structure analogous to that of the first and second mould blocks of the first embodiment of the device according to the invention.

Figure 11:
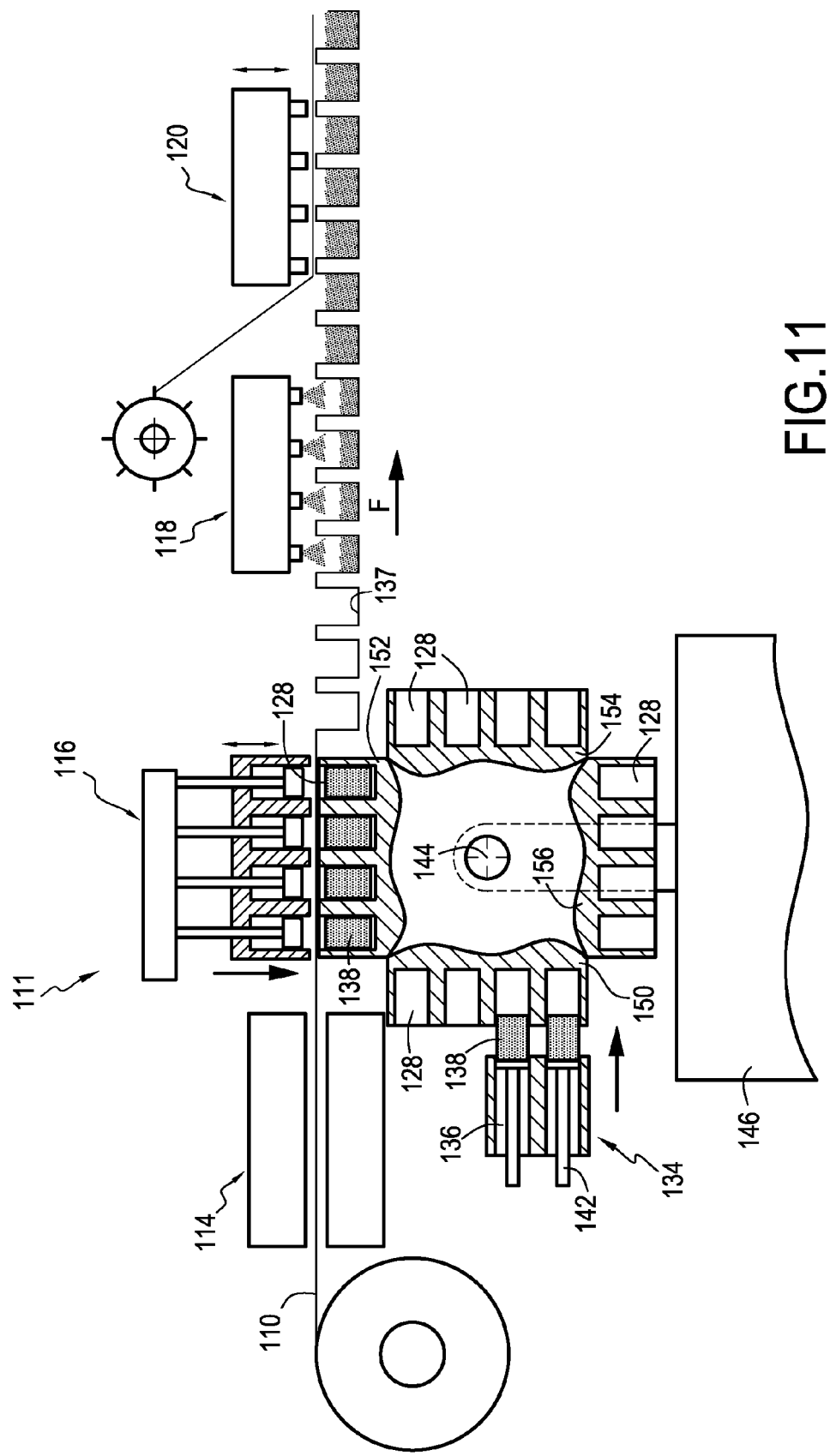
FIG. 11 is a diagrammatic view of the second embodiment of the device according to the invention, in which the first mould block is in the tilted position at the first level, while the second mould block is in the thermoforming position.

As can be seen in FIG. 11, the four mould blocks 150, 152, 154 and 156 are mounted on a rotating barrel 148, capable of pivoting about a pivoting axle 144, analogous to that of the first embodiment of the device according to the invention.

This pivoting axle 144 is carried by a plate 146, analogous to the plate 46 of the first embodiment of the device.

The four mould blocks 150, 152, 154, 156 are arranged at the periphery of the barrel 148, in such a way that two adjacent mould blocks are orthogonal in relation to one another. In this case, the first mould block 150 is orthogonal to the second 152 and the fourth 156 mould blocks, while the second mould block 152 is orthogonal to the first 150 and third 154 mould blocks.

Apart from this, the pivoting axle 144 constitutes an axis of symmetry for the assembly of mould blocks 149.

In addition to this, the barrel 148 is arranged such as to pivot in one direction only, namely that direction in which a mould block is conveyed from the tilted position at the second level into the working position. In the example represented in the Figures, this is a clockwise direction.

Preferably, the barrel 148 pivots when the plate 146 is essentially in the low position in order not to strike the lower end of the press of the thermoforming station 116 during pivoting.

It will therefore be understood that, when the barrel is caused to pivot four times through an angle of 90° in this same direction, it returns to its initial position.

In addition to this, the means of introduction comprise a single introduction device 134, arranged on one of the sides of this assembly of mould blocks 149.

This introduction device consists of an introduction block 134 similar to the upstream introduction block 34 of the first embodiment of the device according to the invention.

The second embodiment of the device according to the invention will now be described in greater detail, starting from FIG. 11, in which the first mould block is in the tilted position at the first level, the second mould block, of which the thermoforming chambers contain banderols 138, is in the thermoforming position and the third mould block and the fourth mould block are in the intermediate positions.

In this position, two rows of decorative banderols 138 are introduced laterally into two associated rows of thermoforming chambers 128 of the first mould block 150, from the introduction chambers of the introduction block 134.

Still in this position, thermoforming of a series of four rows of receptacles 137 is carried out in the thermoforming chambers of the second mould block 152, which is in the thermoforming position.

After the thermoforming of the series of receptacles 137 in the second mould block 152, the plate 146 is moved downwards in such a way as, on the one hand, to convey the second mould block 152 into the removal position in order to remove this series of receptacles 137 and, on the other, to convey the first mould block 150 into the tilted position at the second level.

Figure 12:
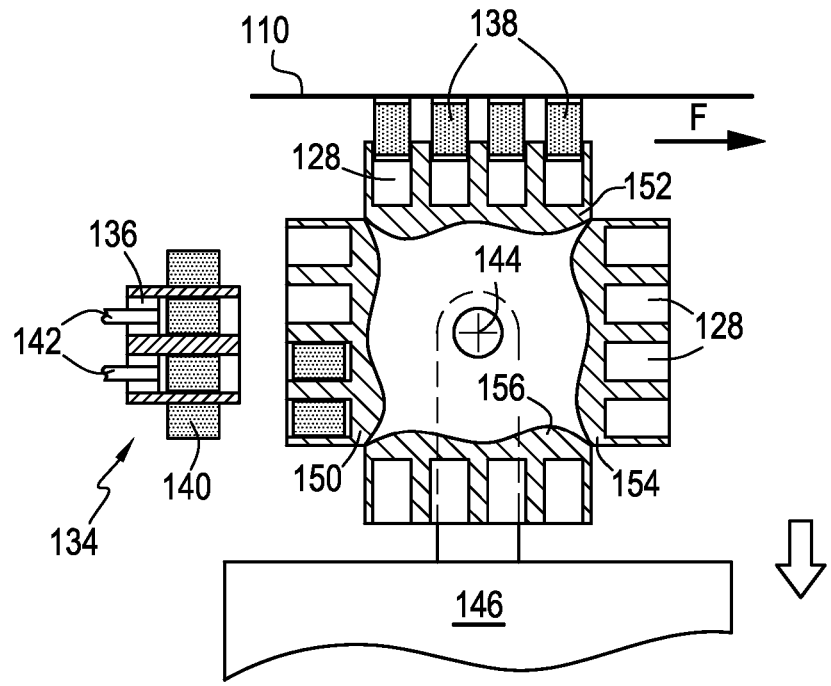
FIG. 12 is a diagrammatic view of the second embodiment of the device according to the invention, showing the simultaneous displacement of the first block into the tilted position at the second level and the second block into the removal position.

During this period, as can be seen in FIG. 12, new decorative banderols 138 are rolled into the introduction chambers 136 of the introduction block 134.

Figure 13:
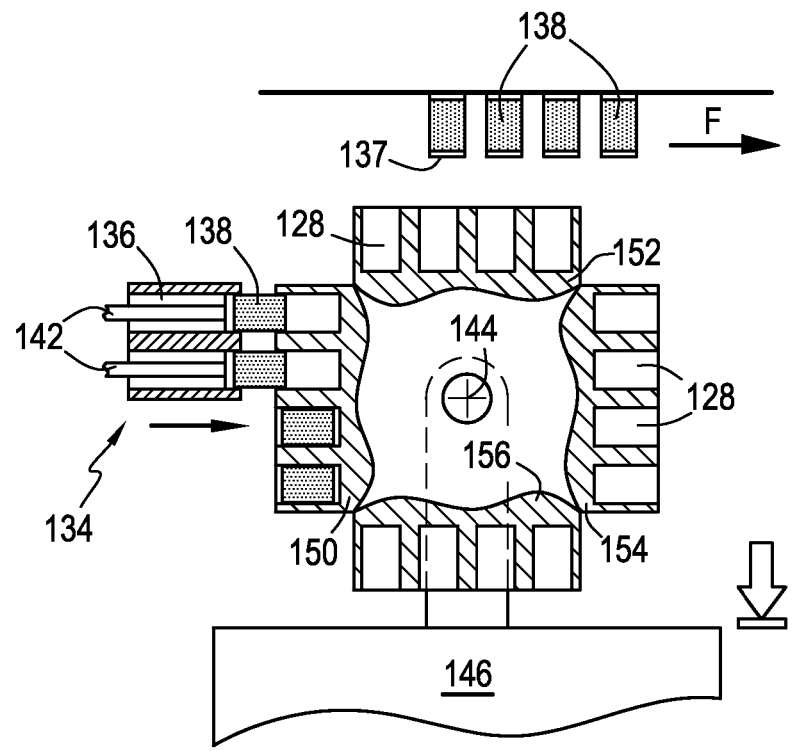
FIG. 13 is a diagrammatic view of the second embodiment of the device according to the invention, in which the first mould block is in the tilted position at the second level, while the second mould block is in the removal position.

When the plate 146 is in the low position, as represented in FIG. 13, the thermoplastic strip 110 advances in such a way as to transfer the four rows of receptacles 137 which have just been thermoformed to the filling station. During this time, two other rows of decorative banderols 138 are introduced into the two other rows of thermoforming chambers 128 of the first mould block 24, from the introduction chambers of the introduction block 134.

It will be understood that at this moment each of the thermoforming chambers of the first mould block 150 contains a decorative banderol 138.

Figure 14:
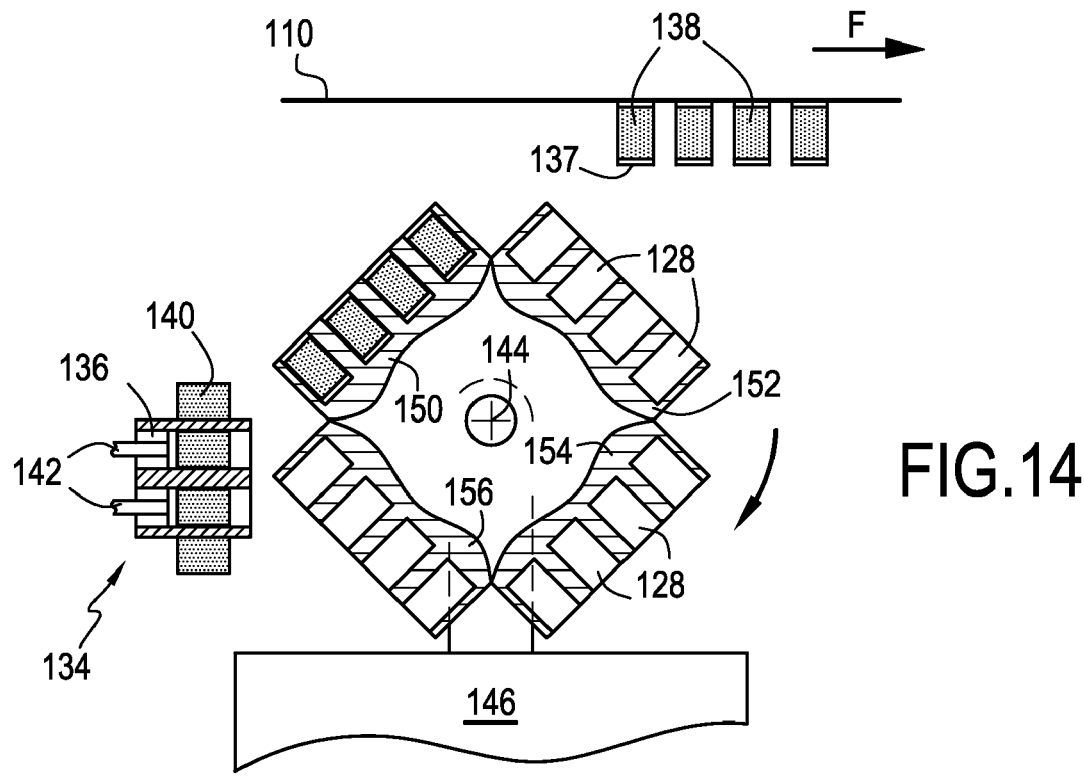
FIG. 14 is a diagrammatic view of the second embodiment of the device according to the invention, showing the simultaneous displacement of the first mould block into the working position and of the fourth mould block into the tilted position at the first level.

Next, as can be seen in FIG. 14, the barrel 158 is pivoted through 90° clockwise and then the plate 146 is moved into its high position, in such a way as to convey the first mould block 150 into the thermoforming position and the fourth mould block 156 into the tilted position at the first level.

Figure 15:
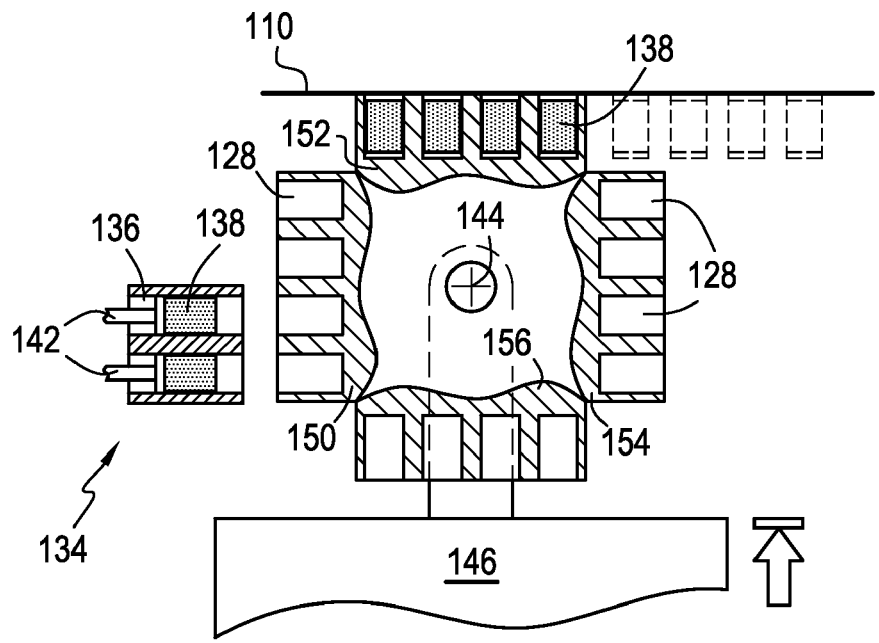
FIG. 15 is a diagrammatic view of the second embodiment of the device according to the invention, in which the first mould block is in the working position just before thermoforming and the fourth mould block is in the tilted position at the first level just before the introduction of the banderols.

In this position, shown in FIG. 15, thermoforming of a series of four rows of recipients 137 is carried out in the first mould block 150, and, during this time, two rows of decorative banderols 138 are introduced into the two rows of thermoforming chambers of the fourth mould block 156.

The operations shown in the diagram in FIG. 15 are therefore the same as those from FIG. 11, inasmuch as the rotating barrel has pivoted through 90° in the clockwise direction.

After the thermoforming of the series of receptacles 137 in the first mould block 150, it will be understood that the stages described above will be repeated in order to thermoform series of receptacles 137 successively in the fourth 156, third 154, then again in the second 152 mould blocks.

The complete cycle of the method according to the invention has therefore been described in its second mode of implementation, in the course of which a series of receptacles 137 is thermoformed in the thermoforming chambers of each of the four mould blocks 150, 152, 154 and 156.

Thus, the invention advantageously allows four rows of decorative banderols 138 to be introduced into the thermoforming chambers 128 of each of the mould blocks 150, 152, 154 and 156, with the aid of two rows of introduction chambers, this introduction being carried out laterally from one single side of the rotating barrel 149.

The single introduction block 134 is arranged on one single side of the rotating barrel 148, such that it is easy to get access to the other side of the barrel, and in particular to the mould block which is placed in the second tilted position.

It is understood that it is therefore advantageously possible, for example for maintenance operations, to dismantle the rotating barrel 149, or simply to get access to the mould block located in the second tilted position without having to dismantle the introduction block 134.

Since each of the mould blocks is capable of attaining this second tilted position, it will be understood that each of the mould blocks 150, 152, 154, 156 is easily accessible in succession.

It should be apparent that the foregoing relates only to the preferred embodiments of the present application and that numerous changes and modifications may be made herein without departing from the general spirit and scope of the invention as defined by the following claims and the equivalents thereof.

The invention claimed is:

1. Method of manufacture of receptacles by thermoforming comprising: placing of decorative banderols on the receptacles; providing a first mold block which comprises at least one thermoforming chamber and which is capable of tilting between a working position for vertically thermoforming of receptacles and a tilted position for the introduction of a decorative banderol into the thermoforming chamber before the thermoforming of a receptacle in the said chamber; providing at least one second mold block analogous to the first mould block and wherein while the first mould block is in the working position for the thermoforming of a receptacle in the thermoforming chamber of the first mould block, the second mould block or, one of the second mould blocks, is in the tilted position for the introduction of a decorative banderol into the thermoforming chamber of the second mold block before the thermoforming of another receptacle in the chamber of the second mold block; wherein the method further comprises moving one of the mould blocks in the working position between a thermoforming position in which a receptacle is thermoformed in a thermoforming chamber of this mould block and a removal position in which the receptacle which has just been thermoformed is removed, and wherein the moving simultaneously translates another mould block or blocks between a tilted position at a first level and a tilted position at a second level, and further comprising introducing banderols in said another mould block or blocks in the tilted position at a first level and in the tilted position at a second level.

2. Method according to claim 1, wherein simultaneously one of the mould blocks is conveyed into the working position and the other or one of the other mould blocks is conveyed into the tilted position.

3. Method according to claim 1, wherein a decorative banderol is introduced into a thermoforming chamber of one of the mould blocks in the tilted position during the thermoforming of a receptacle in the thermoforming chamber of the other or one of the other mould blocks in the working position.

4. Method according to claim 1, wherein, after the thermoforming of a receptacle in a thermoforming chamber of one of the mould blocks in the working position, the receptacle is removed and a decorative banderol is introduced into a thermoforming chamber of the other or one of the other mould blocks in the tilted position at the moment of the removal of the thermoformed receptacle.

5. Method according to claim 1, wherein, when one of the mould blocks is moved into the working position between its thermoforming position and its removal position, the other or one of the other mould blocks is moved simultaneously between a tilted position at a first level and a tilted position at a second level.

6. Method according to claim 5, wherein at least one series of decorative banderols is introduced into one of the mould blocks in the tilted position at the first level, while the other or one of the other mould blocks is in the thermoforming position, and at least one series of decorative banderols is introduced into the mould block in the tilted position at the second level, while the other or one of the other mould blocks is in the removal position.

7. Method according to claim 1, wherein a single second mould block is provided and wherein one of the mould blocks is tilted in a first direction and the other mould block is tilted in the other direction, in such a way that, in the tilted position, the introduction of decorative banderols into one of the mould blocks is effected from a first side and the introduction of decorative banderols into the other mould block is effected from the side opposed to the first side.

8. Method according to claim 1, wherein a set of three second mould blocks is provided and wherein the mould blocks are tilted in the same direction, in such a way that, in the tilted position, the introduction of decorative banderols is effected from one single side.

9. Device for the manufacture by thermoforming of receptacles provided with decorative banderols, comprising a first mould block, which comprises at least one thermoforming chamber, an axis for tilting the first mould block between a working position for thermoforming receptacles and a tilted position for the introduction of a banderol into the thermoforming chamber by introduction means before the thermoforming of a receptacle in the said chamber, wherein said device further comprises at least one second mould block analogous to the first mould block, means to cause the said at least one second mould block to tilt between a working position and a tilted position, means for putting one of the mould blocks into a tilted position for the introduction of a banderol into its thermoforming chamber by introduction means before the thermoforming of a receptacle in the said chamber while the other or, as applicable, one of the other mould blocks is in the working position for the thermoforming of a receptacle in the thermoforming chamber of this mould block, wherein the device further comprises means for moving one of the mould blocks in the working position between a thermoforming position in which a receptacle is thermoformed in a thermoforming chamber of this mould block and a removal position in which the receptacle which has just been thermoformed is removed, and wherein the means for moving simultaneously allow for the other mould block or blocks to be translated between a tilted position at a first level and a tilted position at a second level, wherein introduction means are designed for introducing banderols in the other, mould block or blocks in the tilted position at a first level and in the tilted position at a second level.

10. Device according to claim 9, wherein said means for causing the mould blocks to tilt are capable of causing the mould blocks to pivot together about a pivoting shaft.

11. Device according to claim 9, wherein said device comprises one single second mould block and in that the first and second mould blocks are arranged orthogonally in relation to one another.

12. Device according to claim 9, wherein said device comprises a set of three second mould blocks and in that the mould blocks are arranged next to one another in such a way that two adjacent mould blocks are orthogonal in relation to one another.

13. Device according to claim 12, wherein the mould blocks are mounted on a rotating barrel.

14. Device according to claim 9, wherein said means comprise a plate which is movable in relation to the introduction means.

15. Device according to claim 9, wherein said mould blocks form part of an assembly of mould blocks and in that the introduction means are arranged on one side and the other of this assembly.

16. Device according to claim 9, wherein the mould blocks form part of an assembly of mould blocks and in that the introduction means comprise one single introduction device arranged on one of the sides of this assembly.

17. Device according to claim 9, wherein the introduction means are arranged so that the introduction of banderols is carried out in a horizontal plane.

18. Device according to claim 9, wherein the thermoforming chambers of the mould blocks are oriented vertically in the working position, while they are oriented essentially horizontally in the tilted position.

19. Device according to claim 9, wherein introduction means are designed for introducing banderols in the other mould block or blocks in the tilted position at a first level and in the tilted position at a second level.

\* \* \* \* \*